(12) United States Patent
Ueda et al.

(10) Patent No.: US 10,289,120 B2
(45) Date of Patent: May 14, 2019

(54) SELF-POSITION ESTIMATION DEVICE AND SELF-POSITION ESTIMATION METHOD

(71) Applicant: Nissan Motor Co., Ltd., Yokohama-shi, Kanagawa (JP)

(72) Inventors: Hirotoshi Ueda, Kanagawa (JP); Ichiro Yamaguchi, Kanagawa (JP); Chikao Tsuchiya, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/746,898

(22) PCT Filed: Jul. 24, 2015

(86) PCT No.: PCT/JP2015/003728
§ 371 (c)(1),
(2) Date: Jan. 23, 2018

(87) PCT Pub. No.: WO2017/017705
PCT Pub. Date: Feb. 2, 2017

(65) Prior Publication Data
US 2018/0373265 A1 Dec. 27, 2018

(51) Int. Cl.
*G05D 1/02* (2006.01)
*B60W 30/12* (2006.01)
(Continued)

(52) U.S. Cl.
CPC ........... *G05D 1/0274* (2013.01); *B60W 30/12* (2013.01); *G01C 21/165* (2013.01); *G01C 21/20* (2013.01);
(Continued)

(58) Field of Classification Search
None
See application file for complete search history.

(56) References Cited

U.S. PATENT DOCUMENTS

| 2011/0190972 A1* | 8/2011 | Timmons | G01C 21/34 701/31.4 |
| 2013/0138246 A1* | 5/2013 | Gutmann | G05D 1/0231 700/253 |

(Continued)

FOREIGN PATENT DOCUMENTS

| JP | H03022108 A | 1/1991 |
| JP | H11160078 A | 6/1999 |

(Continued)

*Primary Examiner* — Tamara L Weber
(74) *Attorney, Agent, or Firm* — Young Basile Hanlon MacFarlane, P.C.

(57) ABSTRACT

A self-position estimation device includes: a target position detection unit mounted in a vehicle and configured to detect a relative position of a target present around the vehicle and the vehicle; a target position accumulation unit configured to move the detected relative position by a movement amount of the vehicle and to accumulate it as target position data; a curve start position estimation unit configured to estimate a curve start position of a travel path on which the vehicle travels; and a self-position estimation unit configured to perform comparison in which at least the target position data present around the vehicle and the target position data present between a current position of the vehicle and the estimated curve start position, of the accumulated target position data, is compared with the target position information included in the map information to estimate a self-position which is the current position of the vehicle.

7 Claims, 10 Drawing Sheets

(51) Int. Cl.
*G01C 21/16* (2006.01)
*G01C 21/20* (2006.01)
*G01C 21/32* (2006.01)
*G05D 1/00* (2006.01)

(52) U.S. Cl.
CPC ........... *G01C 21/32* (2013.01); *G05D 1/0088* (2013.01); *G05D 1/024* (2013.01); *G05D 1/0246* (2013.01); *G05D 1/0272* (2013.01); *G05D 2201/0213* (2013.01)

(56) References Cited

U.S. PATENT DOCUMENTS

2014/0297093 A1 10/2014 Murai et al.
2017/0008521 A1* 1/2017 Braunstein ............. G01C 21/32

FOREIGN PATENT DOCUMENTS

| JP | H11230765 A | 8/1999 |
| JP | 2000230836 A | 8/2000 |
| JP | 2008250906 A | 10/2008 |
| JP | 2014211862 A | 11/2014 |

* cited by examiner

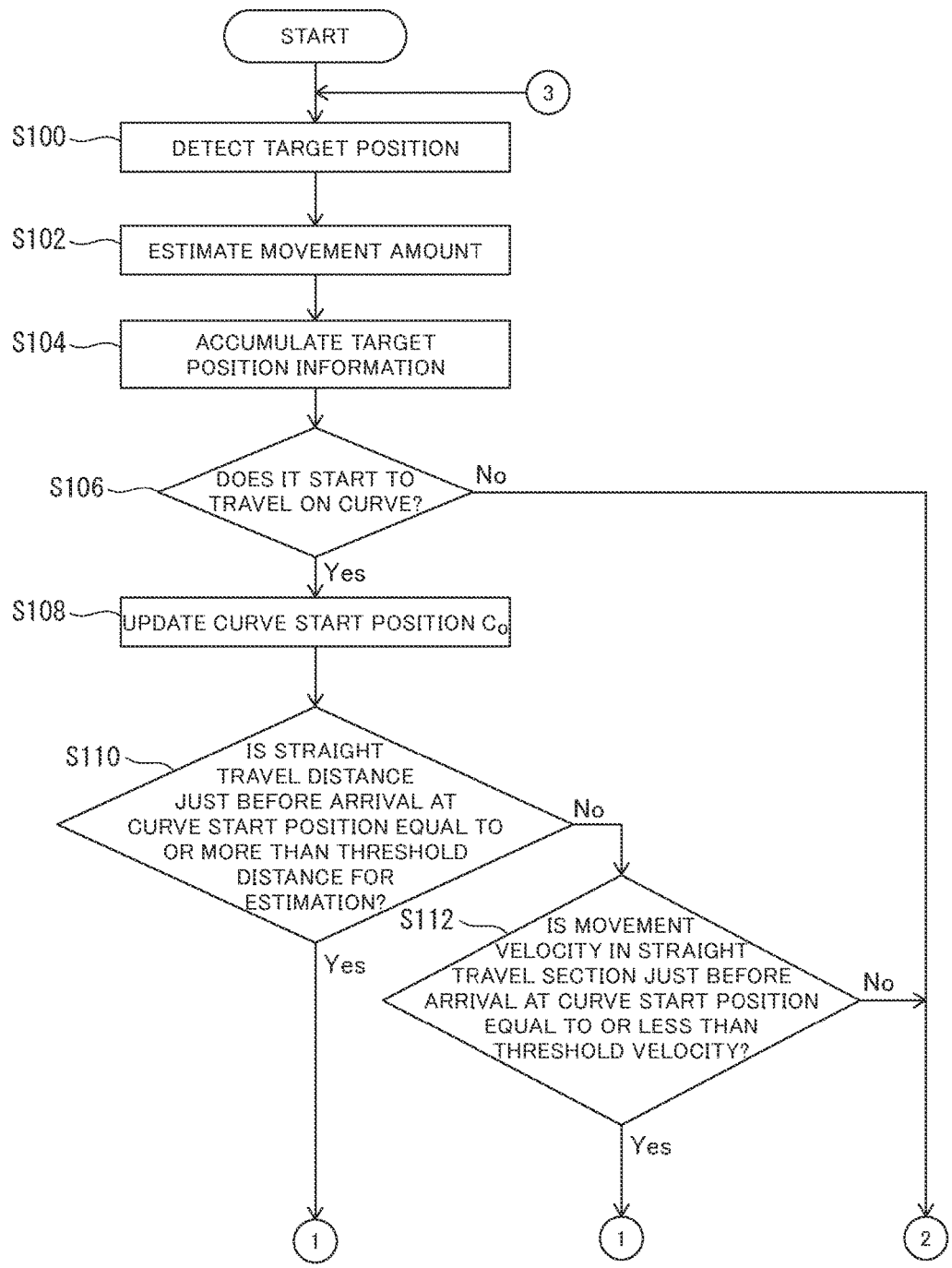

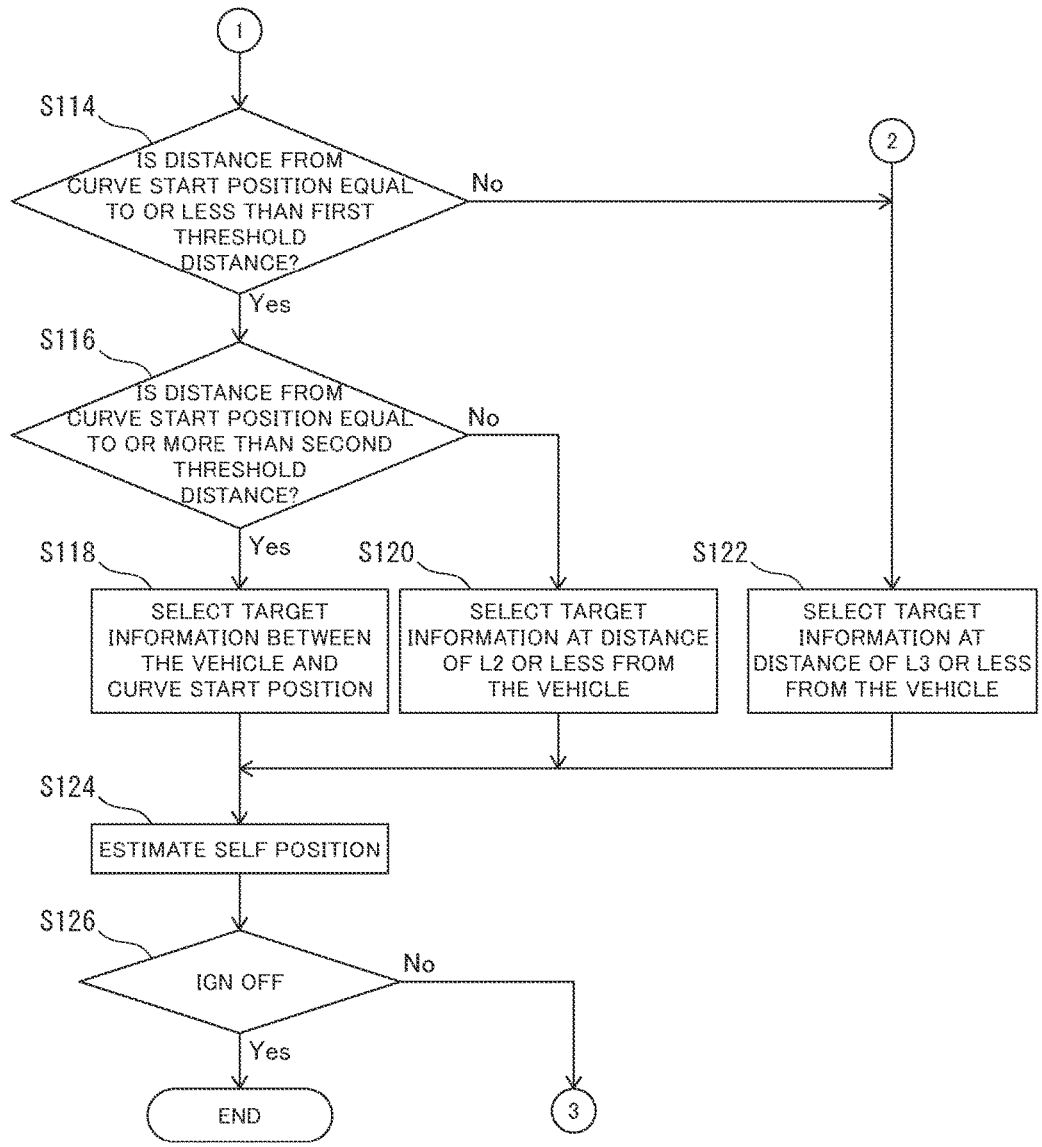

SELF-POSITION ESTIMATION DEVICE AND SELF-POSITION ESTIMATION METHOD

TECHNICAL FIELD

The present invention relates to a self-position estimation device and a self-position estimation method.

BACKGROUND

Examples of technologies to estimate a self-position which is the current position of a movable body include a technology having a configuration described in JP-A-2008-250906. In the technology described in JP-A-2008-250906, environmental information on surroundings present in a predefined region relative to a movable body is limited, and the limited environmental information is compared with an environmental map held in advance to estimate a self-position.

JP-A-2008-250906 In the configuration of JP-A-2008-250906 described above, however, for example, in a case in which the movable body is a vehicle, the position in the forward-backward direction of the movable body traveling on a straight path is estimated by a method in which the distance and direction of movement of the movable body are determined as functions of the rotation angles and rotational angular velocities of right and left wheels (odometry).

Since environmental information on a straight path is more than environmental information on a curved path immediately after an entry from the straight path into the curved path, the accuracy of estimation of a position in a forward-backward direction is deteriorated until environmental information on the curved path is accumulated in technologies to estimate a self-position by such odometry. Therefore, a problem may occur in that the accuracy of estimation of the self-position is deteriorated when the self-position is estimated on the curved path into which the entry is made from the straight path in the technologies to estimate the self-position by the odometry.

SUMMARY

The present invention was made with attention to such problems as described above with an object to provide a self-position estimation device and a self-position estimation method, by which the deterioration of the accuracy of estimation of a self-position on a curved path can be suppressed.

In order to achieve the object mentioned above, according to an aspect of the present invention, a relative position of a target present around a vehicle and the vehicle is detected, and a movement amount of the vehicle and a curve start position of a travel path on which the vehicle travels are estimated. In addition, the detected relative position is moved by the estimated movement amount, and the moved relative position is accumulated as target position data. Further, map information including target position information of a target present on a map is acquired.

In addition, comparison is performed, in which at least the target position data present around the vehicle and the target position data present between a current position of the vehicle and the estimated curve start position, of the accumulated target position data, are compared with the target position information included in the map information, to estimate a self-position of the vehicle.

BRIEF DESCRIPTION OF THE DRAWINGS

FIG. 7A is a flowchart illustrating processing carried out by the self-position estimation device according to the first embodiment of the present invention;

FIG. 7B is a flowchart illustrating the processing carried out by the self-position estimation device according to the first embodiment of the present invention;

DETAILED DESCRIPTION OF THE EMBODIMENTS

In the following detailed description, specific details are described to provide perfect understanding of embodiments of the present invention. However, it will be obvious that one or more embodiments can be embodied even without such specific details. In addition, to simplify the drawings, well-known structures and devices may be illustrated by schematic diagrams.

First Embodiment

A first embodiment of the present invention will be described below with reference to the drawings.

(Configuration of Self-Position Estimation Device)

Figure 1:
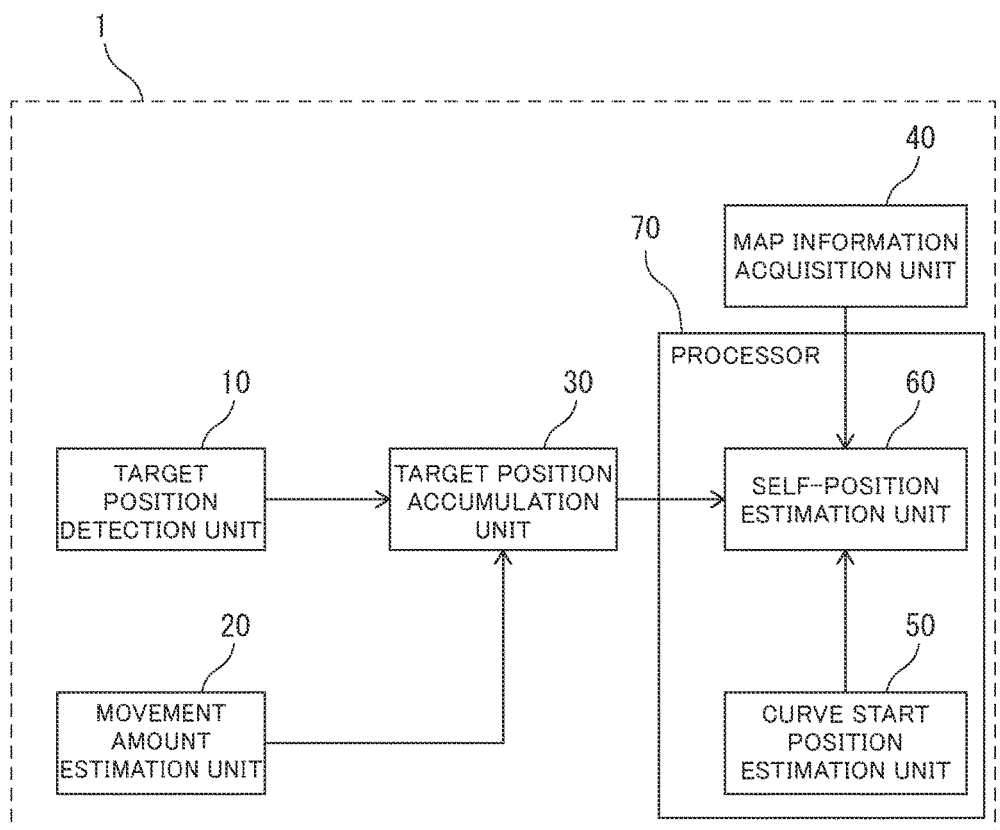
FIG. 1 is a block diagram illustrating the configuration of a self-position estimation device according to a first embodiment of the present invention.
Figure 2:
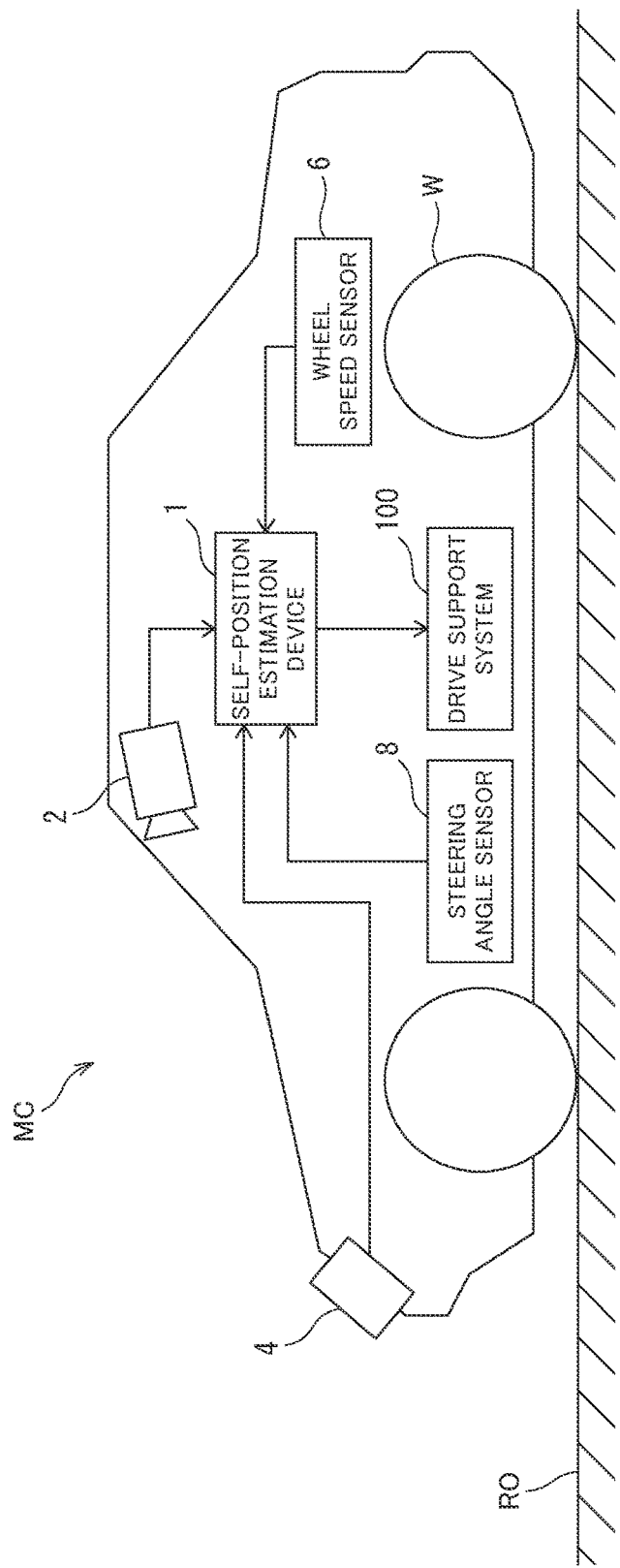
FIG. 2 is a view illustrating the configuration of a vehicle in which the self-position estimation device according to the first embodiment of the present invention is mounted.

The configuration of a self-position estimation device 1 according to the first embodiment will be described with reference to FIG. 1 to FIG. 6. As illustrated in FIG. 1, the self-position estimation device 1 includes a target position detection unit 10, a movement amount estimation unit 20, a target position accumulation unit 30, a map information acquisition unit 40, a curve start position estimation unit 50, and a self-position estimation unit 60. The target position detection unit 10 is formed with, for example, an imaging device 2 such as a wide-angle camera as well as a distance measurement device 4 such as a laser range finder (LRF), as illustrated in FIG. 2. The imaging device 2 is mounted in a vehicle including the self-position estimation device 1 (which may be referred to as "the vehicle" in the following description) as illustrated in FIG. 2. In addition, the imaging device 2 is mounted in the interior of the vehicle MC and images a region in front of the vehicle MC.

The distance measurement device 4 is attached to the exterior of the vehicle MC and mounted in the vehicle MC as illustrated in FIG. 2. In addition, the distance measurement device 4 irradiates a region in front of the vehicle MC with an electromagnetic wave and detects the reflected wave of the electromagnetic wave. A position to which the distance measurement device 4 is attached is in the vicinity of, for example, a hood, a bumper, a license plate, a headlight, or a side mirror.

In addition, the target position detection unit 10 detects the surroundings of the vehicle MC, particularly a target present in front of the vehicle MC, with the imaging device 2 or the distance measurement device 4. Further, the target position detection unit 10 detects the relative positions of the target and the vehicle MC. The target position detection unit 10, which has detected the relative positions of the target and the vehicle MC, outputs an information signal including the detected relative positions (which may be referred to as "relative position signal" in the following description) to the target position accumulation unit 30.

Examples of the target include a line (such as a lane-dividing line) on a travel road surface RO on which the vehicle MC is traveling, a curb on a road shoulder, and a guardrail. Thus, the target position detection unit 10 is mounted in the vehicle MC and detects the relative positions of the target present around the vehicle MC and the vehicle MC. The movement amount estimation unit 20 is formed with sensors such as, for example, a wheel speed sensor 6, a steering angle sensor 8, and a gyro sensor (not illustrated). The wheel speed sensor 6 is mounted in the vehicle MC as illustrated in FIG. 2. In addition, the wheel speed sensor 6 generates wheel speed pulses of which the number is preset per one revolution of a wheel W included in the vehicle MC.

The steering angle sensor 8 is disposed in, for example, a steering column (not illustrated) that rotatably supports a steering wheel (not illustrated), and is mounted in the vehicle MC as illustrated in FIG. 2. In addition, the steering angle sensor 8 detects a current steering angle which is the current rotation angle (steering operation amount) of the steering wheel which is a steering operation element. The gyro sensor is mounted in the vehicle MC and detects a yaw rate generated in the vehicle MC.

In addition, the movement amount estimation unit 20 estimates the movement amount $\Delta P$ of the vehicle MC from a previous processing cycle by using a parameter detected by each sensor. The movement amount estimation unit 20 which has estimated the movement amount $\Delta P$ of the vehicle MC outputs an information signal including the estimated movement amount $\Delta P$ (which may be referred to as "movement amount signal" in the following description) to the target position accumulation unit 30. Thus, the movement amount estimation unit 20 is mounted in the vehicle MC and estimates the movement amount of the vehicle MC.

The target position accumulation unit 30 receives an input of the relative position signal of the target present around the vehicle MC from the target position detection unit 10 and receives an input of the movement amount signal from the movement amount estimation unit 20. The target position accumulation unit 30 accumulates the relative position of the target present around the vehicle MC, included in the relative position signal, and corrects the previously accumulated relative position of the target to a position relative to the current vehicle MC by using the amount of time elapsed to the current time and the movement amount included in the movement amount signal. Further, the target position accumulation unit 30 accumulates data on a target position which is the corrected relative position (which may be referred to as "target position data" in the description). When the target position data has been already accumulated, the target position accumulation unit 30 updates the accumulated target position data by using the movement amount included in the movement amount signal.

For updating the target position data, the relative position included in the already accumulated target position data is relatively moved by the movement amount $\Delta P$ included in the movement amount signal. In addition, the accumulated target position data is overwritten with the relative position relatively moved by the movement amount $\Delta P$ to update the target position data.

Thus, the target position accumulation unit 30 is mounted in the vehicle MC. In addition, the target position accumulation unit 30 accumulates the data on the relative positions detected by the target position detection unit 10. In addition, the target position accumulation unit 30 moves the data on the previously accumulated relative position of the target in a direction reverse to the direction of movement of the vehicle MC by the amount $\Delta P$ of movement for the amount of time elapsed to the current time, estimated by the movement amount estimation unit 20, and accumulates the moved data as the target position data.

The map information acquisition unit 40 is mounted in the vehicle MC and acquires map data and the position information of the target present on the map data. For example, the map information acquisition unit 40 is a car navigation system, a map database, or the like.

The map information acquisition unit 40 may externally acquire map information through a communication system such as wireless communication (which may be road-vehicle-communication or vehicle-vehicle-communication). In this case, the map information acquisition unit 40 may regularly obtain the latest map information to update the possessed map information. The map information acquisition unit 40 may also accumulate, as the map information, a track on which the vehicle has actually traveled. Thus, the map information acquisition unit 40 acquires the map information including the target position information of the target present on a map.

The curve start position estimation unit 50 determines whether or not a travel path on which the vehicle MC is traveling is a curve section. The curve start position estimation unit 50 which has determined whether or not the travel path on which the vehicle MC is traveling is the curve section outputs an information signal including the determination result (which may be referred to as "determination result signal" in the following description) to the self-position estimation unit 60.

In addition, the curve start position estimation unit 50 estimates the start position of the curve section (which may be referred to as "curve start position" in the following description) when determining that the travel path on which the vehicle MC is traveling is the curve section.

Figure 3:
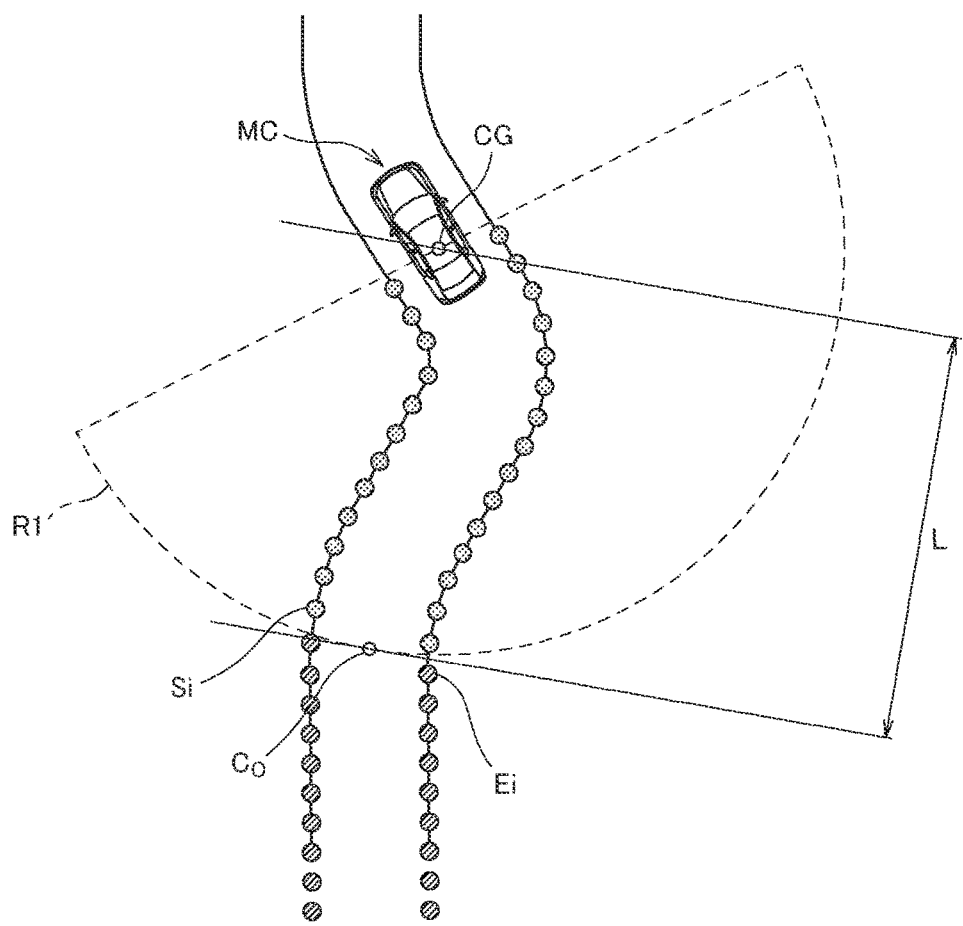
FIG. 3 is an explanatory diagram of a curve start position and data selection processing.

The curve start position is a position at which the travel path on which the vehicle MC travels is changed from a straight section to the curve section, as illustrated in FIG. 3. In FIG. 3, the curve start position is denoted by reference character "$C_0$". In FIG. 3, the center of gravity of the vehicle MC is denoted by reference character "CG". The curve start position estimation unit 50 which has estimated the curve start position $C_0$ outputs an information signal including the estimated curve start position $C_0$ (which may be referred to as "curve start position signal" in the following description) to the self-position estimation unit 60.

For example, at least one processing of the following curve section determination processing AI to AIII is used as processing of determining whether or not the travel path on which the vehicle MC is traveling is the curve section by the curve start position estimation unit 50 (curve section determination processing).

(Curve Section Determination Processing AI) When the absolute value of the current steering angle detected by the steering angle sensor 8 varies from less than a preset steering angle threshold to not less than the steering angle threshold, it is determined that the travel path on which the vehicle MC is traveling is the curve section.

(Curve Section Determination Processing AII) When the absolute value of the yaw rate detected by the gyro sensor varies from less than a preset yaw rate threshold to not less than the yaw rate threshold, it is determined that the travel path on which the vehicle MC is traveling is the curve section.

(Curve Section Determination Processing AIII) The self-position estimated by the self-position estimation unit 60 in the previous processing is input to the map data acquired by the map information acquisition unit 40. When the self-position estimated by the self-position estimation unit 60 in the previous processing is on a curve section in the map data, it is determined that the travel path on which the vehicle MC is traveling is the curve section. Thus, the curve start position estimation unit 50 is mounted in the vehicle MC and estimates the curve start position $C_0$ of the travel path on which the vehicle MC is traveling.

The self-position estimation unit 60 selects target position data used for estimating the current position of the vehicle MC (self-position) from the target position data accumulated by the target position accumulation unit 30. In the following description, the target position data selected for use in the estimation of the self-position may be referred to as "selected target position data." The processing of selecting the target position data used for estimating the self-position will be described later. In addition, the self-position estimation unit 60 estimates the self-position by comparing the selected target position data with the position information of the target acquired by the map information acquisition unit 40. The processing of comparing the selected target position data with the target position information acquired by the map information acquisition unit 40 will be described later. The curve start position estimation unit 50 and the self-position estimation unit 60 may be configured by a processor 70 as illustrated in FIG. 1

In the first embodiment, a case is described in which the configuration of the self-position estimation unit 60 is a configuration in which the self-position is estimated using the target position data present around the vehicle MC and the target position data between the current position of the vehicle MC and the curved path start position. The estimation of the self-position is performed in a case in which a straight travel distance LS which is a distance for which the vehicle MC travels straight is equal to or more than a preset threshold distance $LS_0$ for estimation (for example, $LS_0$=100 [m]). Processing of calculating the straight travel distance LS will be described later. The self-position estimation unit 60 which has estimated the self-position outputs an information signal including the estimated self-position (which may be referred to as "self-position signal" in the following description) to a drive support system 100 as illustrated in FIG. 2.

The drive support system 100, which is a known system, is mounted in the vehicle MC. The drive support system 100 provides information such as an alarm to a driver of the vehicle MC and performs drive support such as braking of the vehicle MC by using the self-position included in the self-position signal input from the self-position estimation device 1. The configuration of the drive support system 100 is known in the art, and therefore a description thereof is omitted.

(Processing of Calculating Straight Travel Distance LS) The processing of calculating the straight travel distance LS by the self-position estimation unit 60 (straight travel distance calculation processing) will be described below with reference to FIG. 1 to FIG. 3. In the straight travel distance calculation processing, it is first determined whether or not the vehicle MC is traveling straight. Counting of a travel distance is started from the time point at which it is determined that the vehicle MC is traveling straight, and the counting of the travel distance is stopped at the time point at which it is determined that the vehicle MC is not traveling straight. A distance for which the vehicle MC moves between the start and stop of the counting is further calculated as the straight travel distance LS. For example, at least one processing of the following straight travel determination processing I to III is used as the processing of determining whether or not the vehicle MC is traveling straight by the self-position estimation unit 60 (straight travel determination processing).

(Straight Travel Determination Processing I) When the absolute value of the current steering angle detected by the steering angle sensor 8 is less than a steering angle threshold, it is determined that the vehicle MC is traveling straight.

(Straight Travel Determination Processing II) When the absolute value of the yaw rate detected by the gyro sensor is less than a preset yaw rate threshold, it is determined that the vehicle MC is traveling straight.

(Straight Travel Determination Processing III) The self-position estimated by the self-position estimation unit 60 in the previous processing is input to the map data acquired by the map information acquisition unit 40. When the self-position estimated by the self-position estimation unit 60 in the previous processing is on a straight section in the map data, it is determined that the vehicle MC is traveling straight. The straight section can be determined based on a predetermined threshold value set at, for example, a curvature of a road section included in the map data of 1000 R or more. The curvature of the road section may also be estimated by approximating a curve formed of node points in the map data.

The absolute value of the steering angle detected by the steering angle sensor 8 and the absolute value of the yaw rate detected by the gyro sensor are acquired from, for example, the steering angle sensor 8 and the gyro sensor. The absolute value of the steering angle detected by the steering angle sensor 8 and the absolute value of the yaw rate detected by the gyro sensor may also be acquired from, for example, the movement amount estimation unit 20.

(Processing of Selecting Target Position Data Used for Estimating Self-position) The processing of selecting the target position data used for estimating the self-position from the target position data accumulated by the target position accumulation unit 30 by the self-position estimation unit 60 (data selection processing) will be described below with reference to FIG. 4 and FIG. 5 while referring to FIG. 1 to FIG. 3. In the data selection processing, it is first determined whether or not the following conditions BI to BIII are satisfied.

(Condition BI) The straight travel distance LS just before arrival at the curve start position $C_0$ estimated by the curve start position estimation unit 50 is equal to or more than the threshold distance $LS_0$ for estimation. Alternatively, a movement velocity in straight travel just before arrival at the curve start position $C_0$ estimated by the curve start position estimation unit 50 is equal to or less than a movement velocity threshold. The straight travel distance LS is calculated in (Processing of Calculating Straight Travel Distance LS) described above.

(Condition BII) A distance between the vehicle MC and the curve start position $C_0$ estimated by the curve start position estimation unit 50 is equal to or less than a preset first threshold distance L1 (for example, L1=100 [m]). The first threshold distance L1 is set based on, for example, a distance range in which the accumulated error of a movement amount estimated by the movement amount estimation unit 20 is acceptable.

(Condition BIII) The distance between the vehicle MC and the curve start position $C_0$ estimated by the curve start position estimation unit 50 is equal to or more than a preset second threshold distance L2 (for example, L2=20 [m]). When all of the condition BI, condition BII, and condition BIII of the conditions described above are satisfied, the target position data present around the vehicle MC is selected from the target position data accumulated by the target position accumulation unit 30. In addition, the target position data between the current position of the vehicle MC and the curve start position $C_0$ is selected from the target position data accumulated by the target position accumulation unit 30.

In other words, only the target position data present in a region R1 around the vehicle MC and between the current position of the vehicle MC and the curve start position $C_0$, as illustrated in FIG. 3, is selected as the selected target position data from the target position data accumulated by the target position accumulation unit 30. The selected target position data of which the relative position has been detected before arrival at the curve start position $C_0$ in the direction of travel of the vehicle MC is denoted by reference character "Ei" in FIG. 3. Likewise, the selected target position data of which the relative position has been detected between the current position of the vehicle MC and the curve start position $C_0$ in the direction of travel of the vehicle MC is denoted by reference character "Si" in FIG. 3.

When only the condition BI and condition BII of the conditions described above are satisfied, the target position data present in a region in which a distance relative to the vehicle MC is equal to or less than the second threshold distance L2 is selected from the target position data accumulated by the target position accumulation unit 30. The second threshold distance L2 is a distance including the target position data between the current position of the vehicle MC and the curve start position $C_0$ estimated by the curve start position estimation unit 50, out of the target position data accumulated by the target position accumulation unit 30.

Figure 4:
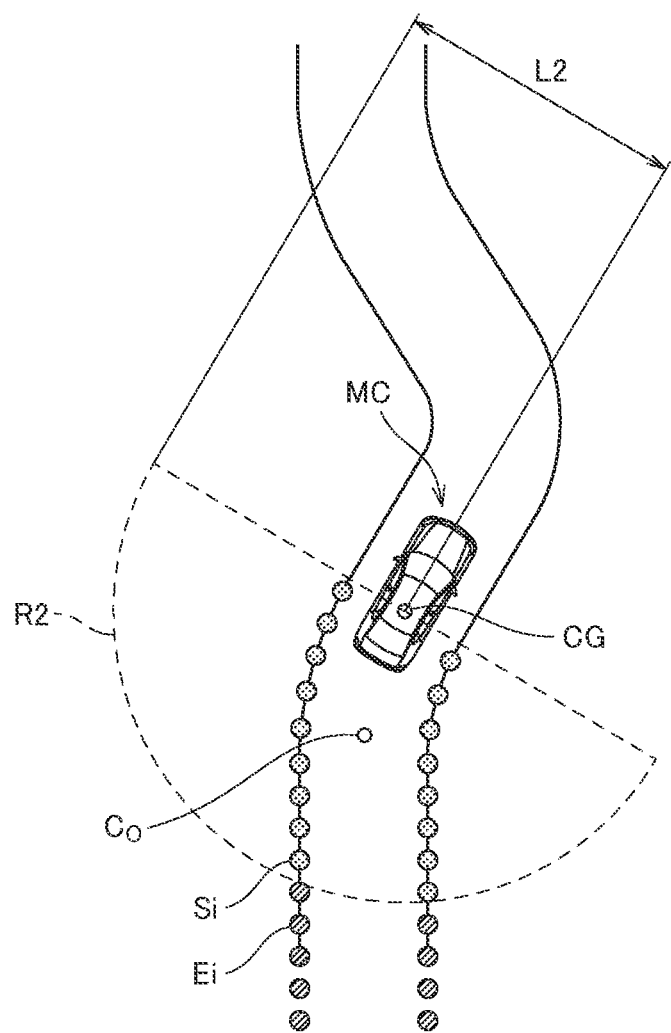
FIG. 4 is an explanatory diagram of data selection processing.

In other words, the target position data present in a region R2 which is at not more than the second threshold distance L2 from the vehicle MC in a region in which the vehicle MC has traveled, as illustrated in FIG. 4, is selected as the selected target position data from the target position data accumulated by the target position accumulation unit 30. The second threshold distance L2 is set as a distance range in which at least the target position data required for estimating the self-position by comparison with the position information of the target acquired by the map information acquisition unit 40 can be ensured.

The selected target position data present in the region R2, which is at more than the second threshold distance L2 from the vehicle MC, in the region in which the vehicle MC has traveled is denoted by reference character "Ei" in FIG. 4. Likewise, the selected target position data present in the region R2 which is at not more than the second threshold distance L2 from the vehicle MC in the region in which the vehicle MC has traveled is denoted by reference character "Si" in FIG. 4. In FIG. 4, the region R2 is regarded as a region which is at not more than the second threshold distance L2 from the center of gravity CG of the vehicle MC.

When only the condition BI of the conditions described above is satisfied, the target position data present in a region in which a distance relative to the vehicle MC is equal to or less than a preset third threshold distance L3 is selected from the target position data accumulated by the target position accumulation unit 30. When none of the conditions described above is satisfied, the target position data present in the region in which a distance relative to the vehicle MC is equal to or less than the third threshold distance L3 is also selected from the target position data accumulated by the target position accumulation unit 30, in a similar manner.

The third threshold distance L3 is set as a distance range in which the target position data required for estimating the self-position by comparison with the position information of a target acquired by the map information acquisition unit 40 can be sufficiently ensured. In other words, the third threshold distance L3 can be set at, for example, a distance which is less than the first threshold distance L1 and which is more than the second threshold distance L2 (L1>L3>L2). The third threshold distance L3 is a distance including the target position data present between the current position of the vehicle MC and the curve start position $C_0$ estimated by the curve start position estimation unit 50, in the target position data accumulated by the target position accumulation unit 30.

Figure 5:
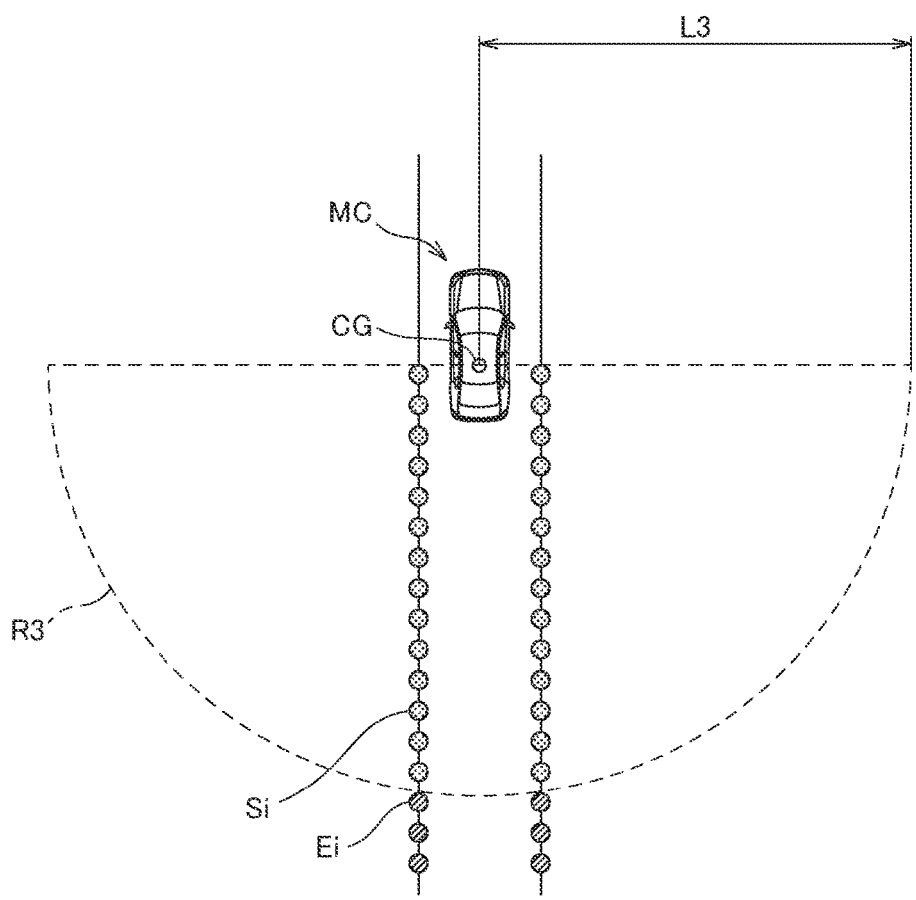
FIG. 5 is an explanatory diagram of data selection processing.

In other words, the target position data present in a region R3 which is at not more than the third threshold distance L3 from the vehicle MC in a region in which the vehicle MC has traveled, as illustrated in FIG. 5, is selected as the selected target position data from the target position data accumulated by the target position accumulation unit 30. The selected target position data present in the region R3, which is at more than the third threshold distance L3 from the vehicle MC, in the region in which the vehicle MC has traveled is denoted by reference character "Ei" in FIG. 5. Likewise, the selected target position data present in the region R3 which is at not more than the third threshold distance L3 from the vehicle MC in the region in which the vehicle MC has traveled is denoted by reference character "Si" in FIG. 5. In FIG. 5, the region R3 is regarded as a region which is at not more than the third threshold distance L3 from the center of gravity CG of the vehicle MC.

Figure 6:
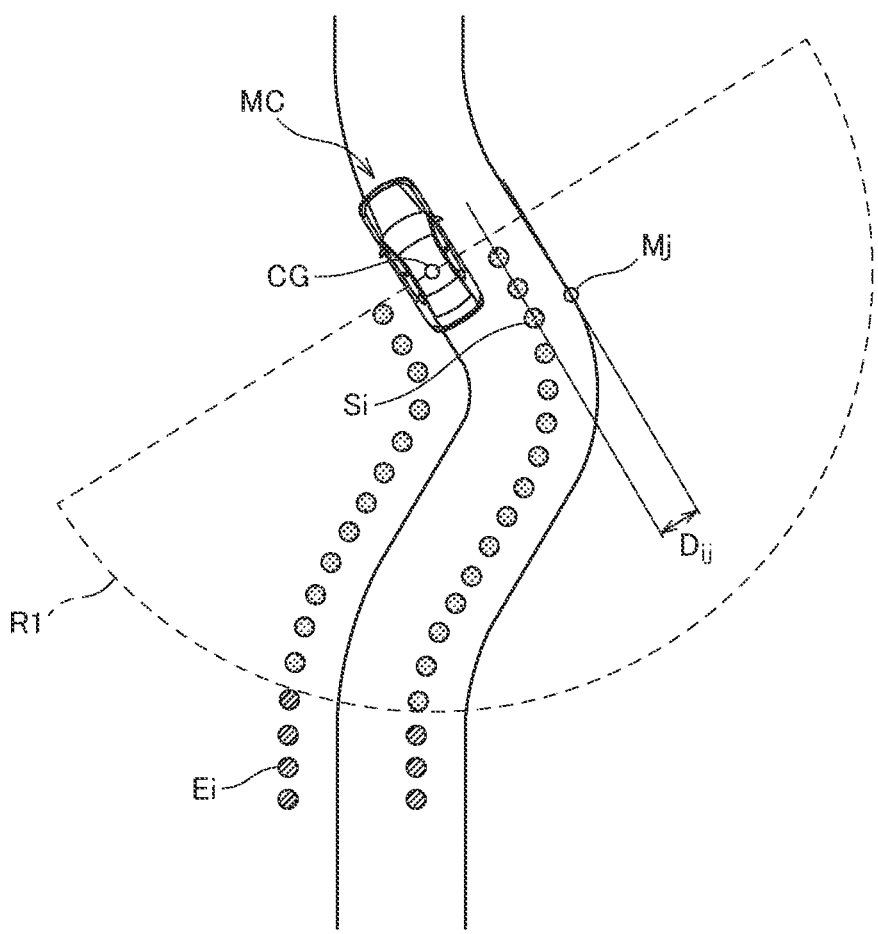
FIG. 6 is an explanatory diagram of data comparison processing.

(Processing of Comparing Selected Target Position Data with Position Information of Target Acquired by Map Information Acquisition Unit 40) The processing of comparing the selected target position data with the position information of the target acquired by the map information acquisition unit 40 by the self-position estimation unit 60 (data comparison processing) will be described below with reference to FIG. 6 while referring to FIG. 1 to FIG. 5.

In the data comparison processing, the selected target position data selected in the data selection processing is compared with the position information of the target acquired by the map information acquisition unit 40. Specifically, a distance Dij between one selected piece of the selected target position data Si of the selected target position data and position information Mj that is closest to the one selected piece of target position data Si, of the position information of the target acquired by the map information acquisition unit 40, is calculated as illustrated in FIG. 6. Therefore, the selected target position data Si and the position information Mj are present in the same region (R1, R2, or R3). Such distances Dij are calculated for all the pieces of selected target position data.

The average S of the distances Dij is calculated using the following Equation (1).

[math. 1]

$$S = (\Sigma D_{ij})/N \qquad (1)$$

"N" in Equation (1) represents the number of the pieces of selected target position data selected in the data selection processing. The position and posture of the vehicle MC with the lowest average S are calculated by numerical analysis, and the calculated position and posture of the vehicle MC are regarded as the estimated values of the self-position.

As described above, the self-position estimation unit 60 compares the target position data present around the vehicle MC and the selected target position data present between the current position of the vehicle MC and the curve start position $C_0$ with the target position information included in the map data information to estimate the self-position. The self-position estimation unit 60 is mounted in the vehicle MC.

In addition, the self-position estimation unit 60 selects the target position data present in the range (region R2 or R3) in which the vehicle MC is traced back at the threshold distance (second threshold distance L2 or third threshold distance L3) in the travel pathway of the vehicle MC from the target position data accumulated by the target position accumulation unit 30. The self-position estimation unit 60 further compares the position of a target present in the range in which the vehicle MC is traced back at the threshold distance in the travel pathway of the vehicle MC, of the target position information acquired by the map information acquisition unit 40, with the selected target position data to estimate the self-position.

(Operation) An example of operation performed using the self-position estimation device 1 according to the first embodiment will be described with reference to FIG. 7A and FIG. 7B while referring to FIG. 1 to FIG. 6.

First, the processing of step S100 is carried out when the operation is performed using the self-position estimation device 1 is started (START) as illustrated in FIG. 7A and FIG. 7B.

In step S100, the target position detection unit 10 detects the target present in an area around the vehicle MC, including an area in front of the vehicle MC, and detects the relative positions of the detected target and the vehicle MC ("DETECT TARGET POSITION" illustrated in the figure). When the relative positions of the target and the vehicle MC are detected in step S100, the operation performed using the self-position estimation device 1 goes to step S102.

In step S102, the movement amount estimation unit 20 estimates the movement amount ΔP of the vehicle MC from the previous processing cycle ("ESTIMATE MOVEMENT AMOUNT" illustrated in the figure). When the movement amount ΔP of the vehicle MC is estimated in step S102, the operation performed using the self-position estimation device 1 goes to step S104.

In step S104, the target position accumulation unit 30 corrects the relative positions detected in step S100 by using the movement amount of the vehicle MC estimated in step S102. In addition, the target position accumulation unit 30 accumulates the target position data ("ACCUMULATE TARGET POSITION INFORMATION" illustrated in the figure) in step S104. When the target position data is accumulated in step S104, the operation performed using the self-position estimation device 1 goes to step S106.

In step S106, the curve start position estimation unit 50 determines whether or not a travel path on which the vehicle MC is traveling is a curve section. As a result, processing of determining whether or not the vehicle MC starts to travel on a curve section ("DOES IT START TO TRAVEL ON CURVE?" illustrated in the figure) is carried out in step S106.

When it is determined that the vehicle MC starts to travel on a curve section ("YES" illustrated in the figure) in step S106, the operation performed using the self-position estimation device 1 goes to step S108.

In contrast, when it is determined that the vehicle MC does not start to travel on a curve section ("NO" illustrated in the figure) in step S106, the operation performed using the self-position estimation device 1 goes to step S122.

In step S108, the curve start position estimation unit 50 estimates the curve start position $C_0$ ("ESTIMATE CURVE START POSITION $C_0$" illustrated in the figure). When the curve start position $C_0$ is estimated in step S108, the operation performed using the self-position estimation device 1 goes to step S110.

In step S110, the self-position estimation unit 60 carries out processing of determining whether or not the straight travel distance LS just before arrival at the curve start position $C_0$ is equal to or more than the threshold distance $LS_0$ for estimation ("IS STRAIGHT TRAVEL DISTANCE JUST BEFORE ARRIVAL AT CURVE START POSITION EQUAL TO OR MORE THAN THRESHOLD DISTANCE FOR ESTIMATION?" illustrated in the figure).

When it is determined that the straight travel distance LS just before arrival at the curve start position $C_0$ is equal to or more than the threshold distance $LS_0$ for estimation ("YES" illustrated in the figure) in step S110, the operation performed using the self-position estimation device 1 goes to step S114. In contrast, when it is determined that the straight travel distance LS just before arrival at the curve start position $C_0$ is less than the threshold distance $LS_0$ for estimation ("NO" illustrated in the figure) in step S110, the operation performed using the self-position estimation device 1 goes to step S112.

In step S112, the self-position estimation unit 60 carries out processing of determining whether or not a movement velocity VP in a straight travel section just before arrival at the curve start position $C_0$ is equal to or less than a preset threshold velocity $VP_0$ (for example, $VP_0$=1.4 [m/sec]). In other words, processing of determining whether or not to satisfy "IS MOVEMENT VELOCITY IN STRAIGHT TRAVEL SECTION JUST BEFORE ARRIVAL AT CURVE START POSITION EQUAL TO OR LESS THAN THRESHOLD VELOCITY?" illustrated in the figure is carried out in step S112. The movement velocity may be a vehicle velocity. In this case, the threshold velocity $VP_0$ may be set at, for example, 5 [km/h].

When it is determined that the movement velocity VP in the straight travel section just before arrival at curve start position $C_0$ is equal to or less than the threshold velocity $VP_0$ ("YES" illustrated in the figure) in step S112, the operation performed using the self-position estimation device 1 goes to step S114.

In contrast, when it is determined that the movement velocity VP in the straight travel section just before arrival at the curve start position $C_0$ is more than the threshold velocity $VP_0$ ("NO" illustrated in the figure) in step S112, the operation performed using the self-position estimation device 1 goes to step S122.

In step S114, the self-position estimation unit 60 carries out processing of determining whether or not the above-described condition BII is satisfied. In other words, processing of determining whether or not the distance L between the vehicle MC and the curve start position $C_0$ (see FIG. 3) is equal to or less than the first threshold distance L1 ("IS DISTANCE FROM CURVE START POSITION EQUAL TO OR LESS THAN FIRST THRESHOLD DISTANCE?" illustrated in the figure) is carried out in step S114. The distance L between the vehicle MC and the curve start position $C_0$ is specifically the distance L between the center of gravity CG of the vehicle MC and the curve start position $C_0$.

When it is determined that the distance L between the vehicle MC and the curve start position $C_0$ is equal to or less than the first threshold distance L1 ("YES" illustrated in the figure) in step S114, the operation performed using the self-position estimation device 1 goes to step S116.

In contrast, when it is determined that the distance L between the vehicle MC and the curve start position $C_0$ is more than the first threshold distance L1 ("NO" illustrated in the figure) in step S114, the operation performed using the self-position estimation device 1 goes to step S122.

In step S116, the self-position estimation unit 60 carries out processing of determining whether or not the above-described condition BIII is satisfied. In other words, processing of determining whether or not the distance L between the vehicle MC and the curve start position $C_0$ (see FIG. 3) is equal to or more than the second threshold distance L2 ("IS DISTANCE FROM CURVE START POSITION EQUAL TO OR MORE THAN SECOND THRESHOLD DISTANCE?" illustrated in the figure) is carried out in step S116.

When it is determined that the distance L between the vehicle MC and the curve start position $C_0$ is equal to or more than the second threshold distance L2 ("YES" illustrated in the figure) in step S116, the operation performed using the self-position estimation device 1 goes to step S118.

In contrast, when it is determined that the distance L between the vehicle MC and the curve start position $C_0$ is less than the second threshold distance L2 ("NO" illustrated in the figure) in step S116, the operation performed using the self-position estimation device 1 goes to step S120.

In step S118, the self-position estimation unit 60 selects, as the selected target position data Si, the target position data present in the region R1 between the curve start position $C_0$ and the vehicle MC (see FIG. 3). In other words, the target position data present around the vehicle MC and the target position data present in the region R1 between the current position of the vehicle MC and the curve start position $C_0$ are selected as the selected target position data Si in step S118. Therefore, processing of "SELECT TARGET INFORMATION BETWEEN VEHICLE AND CURVE START POSITION" illustrated in the figure is carried out in step S118. When the target position data present in the region R1 is selected as the selected target position data Si in step S118, the operation performed using the self-position estimation device 1 goes to step S124.

In step S120, the self-position estimation unit 60 selects, as the selected target position data Si, the target position data present in the region R2 in which a distance relative to the vehicle MC is equal to or less than the second threshold distance L2 (see FIG. 4). In other words, the target position data present in the region R2 in which the distance relative to the vehicle MC is equal to or less than the second threshold distance L2 is selected ("SELECT TARGET INFORMATION AT DISTANCE OF L2 OR LESS FROM VEHICLE" illustrated in the figure) as the selected target position data Si in step S120. When the target position data present in the region R2 is selected as the selected target position data Si in step S120, the operation performed using the self-position estimation device 1 goes to step S124.

In step S122, the self-position estimation unit 60 selects, as the selected target position data Si, the target position data present in the region R3 in which a distance relative to the vehicle MC is equal to or less than the third threshold distance L3 (see FIG. 5). In other words, the target position data present in the region R3 in which the distance relative to the vehicle MC is equal to or less than the third threshold distance L3 is selected ("SELECT TARGET INFORMATION AT DISTANCE OF L3 OR LESS FROM VEHICLE" illustrated in the figure) as the selected target position data Si in step S122. When the target position data present in the region R3 is selected as the selected target position data Si in step S122, the operation performed using the self-position estimation device 1 goes to step S124.

In step S124, by the self-position estimation unit 60, the selected target position data Si selected in any one step of steps S118, S120, and S122 is compared with the position information of the target acquired by the map information acquisition unit 40. As a result, the self-position is estimated using the selected target position data Si selected in any one step of steps S118, S120, and S122 ("ESTIMATE SELF-POSITION" illustrated in the figure) in step S124. When the self-position is estimated in step S124, the operation performed using the self-position estimation device 1 goes to step S126.

In step S126, processing of determining whether or not the ignition switch (not illustrated) of the vehicle MC is in a stop state ("IGN OFF" illustrated in the figure) is carried out. When it is determined that the ignition switch of the vehicle MC is in the stop state ("YES" illustrated in the figure) in step S126, the operation performed using the self-position estimation device 1 is ended (END).

In contrast, when it is determined that the ignition switch of the vehicle MC is not in the stop state ("NO" illustrated in the figure) in step S126, the operation performed using the self-position estimation device 1 returns to step S100.

As described above, the relative positions of a target present around the vehicle MC and the vehicle MC are detected, and the movement amount of the vehicle MC and the curve start position $C_0$ of a travel path on which the vehicle MC travels are estimated in the self-position estimation method carried out in the operation of the self-position estimation device 1 according to the first embodiment. The target position data present around the vehicle MC and the target position data between the current position of the vehicle MC and the estimated curve start position $C_0$, of the target position data, are compared with target position information included in the map data to estimate the self-position.

The first embodiment described above is an example of the present invention, the present invention is not limited to the first embodiment described above, and various modifications may be made depending on design or the like without departing from technical idea according to the present invention even if being forms except this embodiment.

Effects of First Embodiment

The self-position estimation device 1 according to the first embodiment can exhibit effects described below.

(1) The curve start position estimation unit 50 estimates the curve start position $C_0$ of a travel path on which the vehicle MC travels. In addition, the self-position estimation unit 60 compares the target position data present around the vehicle MC and the target position data present between the current position of the vehicle MC and the curve start position $C_0$ with target position information included in the map information to estimate the self-position. Therefore, even if the vehicle MC enters a curved path from a straight path, the self-position is estimated using the target position data along the shape of the curve. The target position data along the shape of the curve is the target position data present around the vehicle MC and data present between the current position of the vehicle MC and the curved path start position $C_0$. As a result, the self-position in the curved path is estimated based on the target position data along the shape of the curve, and therefore the deterioration of the accuracy of estimation of the self-position in the curved path can be suppressed.

(2) The self-position estimation unit 60 estimates the self-position when the straight travel distance LS which is a distance for which the vehicle MC has traveled straight is equal to or more than the preset threshold distance $LS_0$ for estimation. Therefore, the self-position is estimated using the target position data present around the vehicle MC and the position of a target present between the current position of the vehicle MC and the curve start position $C_0$ when the straight travel distance LS is equal to or more than the threshold distance $LS_0$ for estimation. As a result, the self-position can be estimated based on the target position data along the shape of a curve even in the case of the long travel distance of a straight path just before arrival at a curved path, i.e., even in the case of travel which is prone to result in accumulation of an error in odometry. As a result, the deterioration of the accuracy of estimation of the self-position in a curved path can be suppressed.

(3) The self-position estimation unit 60 estimates the self-position when the vehicle MC travels at a movement velocity (vehicle velocity) which is equal to or less than a threshold velocity. Therefore, the self-position can be estimated using the target position data present around the vehicle MC and the position of a target present between the current position of the vehicle MC and the curve start position $C_0$ when the vehicle MC travels at a movement velocity (vehicle velocity) which is equal to or less than the threshold velocity. As a result, the deterioration of the accuracy of estimation of the self-position in a curved path can be suppressed even after travel at very low velocity, such as stopping or start, i.e., even after travel which is prone to result in accumulation of an error in odometry.

(4) The self-position estimation unit 60 compares the target position data present in a range in which the vehicle MC is traced back at a threshold distance in the travel pathway of the vehicle MC with target position information included in the map information to estimate the self-position. Therefore, the self-position is estimated using the target position data present in the range in which the vehicle MC is traced back at a threshold distance in the travel pathway of the vehicle MC and the target position information included in the map information. The target position data present in the range in which the vehicle MC is traced back at the threshold distance in the travel pathway of the vehicle MC includes the target position data present around vehicle MC and the target present between the current position of the vehicle MC and the curve start position $C_0$. As a result, the self-position can be estimated using the target position data present in the range of the necessary minimum threshold distance even at the time of entry from a straight path to a curved path or even just after entry from a straight path to a curved path. The target position data present in the range of the necessary minimum threshold distance includes the target position data present around the vehicle MC and the target present between the current position of the vehicle MC and the curve start position $C_0$. As a result, the self-position can be estimated by also using the target position data along the shape of a curve, and therefore the deterioration of the accuracy of estimation of the self-position in a curved path can be suppressed.

(5) The self-position estimation unit 60 compares the target position data present around the vehicle MC and the target position data present only between the current position of the vehicle MC and the curve start position $C_0$ estimated by the curve start position estimation unit 50 with target position information included in the map information. In addition, the self-position is estimated. This estimation is performed when all of the condition BI, condition BII, and condition BIII of the conditions described above are satisfied. Therefore, the self-position can be estimated without using data detected in a straight path and with using the target position data along the shape of a curve even when the vehicle MC enters the curved path from the straight path. The target position data along the shape of the curve is the target position data present around the vehicle MC and the target position data present between the current position of the vehicle MC and the curved path start position $C_0$. As a result, the self-position in the curved path is estimated based on only the target position data along the shape of the curve, and therefore the deterioration of the accuracy of estimation of the self-position in the curved path can be suppressed.

(6) In the self-position estimation method carried out in the operation of the self-position estimation device 1 according to the first embodiment, the relative positions of a target present around the vehicle MC and the vehicle MC are detected, and the movement amount of the vehicle MC and the curve start position $C_0$ of a travel path on which the vehicle MC travels are estimated. The target position data present around the vehicle MC and the target position data present between the current position of the vehicle MC and the estimated curve start position $C_0$, of the target position data, are compared with target position information included in map data to estimate the self-position. Therefore, the self-position is estimated using the target position data along the shape of a curve even when the vehicle MC enters a curved path from a straight path. The target position data along the shape of the curve is the target position data present around the vehicle MC and the target position data present between the current position of the vehicle MC and the curved path start position $C_0$. As a result, the self-position in the curved path is estimated based on the target position data along the shape of the curve, and therefore the deterioration of the accuracy of estimation of the self-position in the curved path can be suppressed.

Alternative Example of First Embodiment (1) In the first embodiment, the movement amount estimation unit 20, the target position accumulation unit 30, the map information acquisition unit 40, the curve start position estimation unit 50, and the self-position estimation unit 60 are mounted in the vehicle MC, but there is no limitation to this configuration. In other words, a configuration is also acceptable in which, for example, a data center (base station) includes at least one of the movement amount estimation unit 20, the target position accumulation unit 30, the map information acquisition unit 40, the curve start position estimation unit 50, and the self-position estimation unit 60.

Second Embodiment

A second embodiment of the present invention will be described below with reference to the drawings.

(Configuration of Self-Position Estimation Device) The configuration of the self-position estimation device 1 according to the second embodiment is the same as the configuration of the first embodiment except processing carried out by the self-position estimation unit 60. Therefore, only the configuration of the self-position estimation unit 60 will be described as the configuration of the self-position estimation device 1 of the second embodiment. The self-position estimation unit 60 selects the selected target position data from the target position data accumulated by the target position accumulation unit 30. Processing of selecting the target position data used for estimating the self-position is similar to that of the first embodiment described above.

In addition, the self-position estimation unit 60 estimates the self-position by comparing the selected target position data with the position information of a target acquired by the map information acquisition unit 40. The processing of comparing the selected target position data with the position information of the target acquired by the map information acquisition unit 40 is similar to that of the first embodiment described above.

In the second embodiment, the self-position estimation unit 60 is configured to make plural comparisons of the selected target position data with the position information of a target. In addition, a case will be described in which the self-position estimation unit 60 is configured to calculate plural minimum errors in the respective comparisons from the results of the plural comparisons and to estimate the self-position when the sum of the plural minimum errors is equal to or more than a preset error threshold (for example, 1 [m]). The self-position estimation unit 60 which has estimated the self-position outputs the self-position signal to the drive support system 100 (see FIG. 2). The other configuration including the configuration of the vehicle MC is the same as that of the first embodiment described above.

(Operation) An example of operation performed using the self-position estimation device 1 according to the second embodiment will be described with reference to FIG. 8A and FIG. 8B while referring to FIG. 1 to FIG. 6.

Figure 8A:
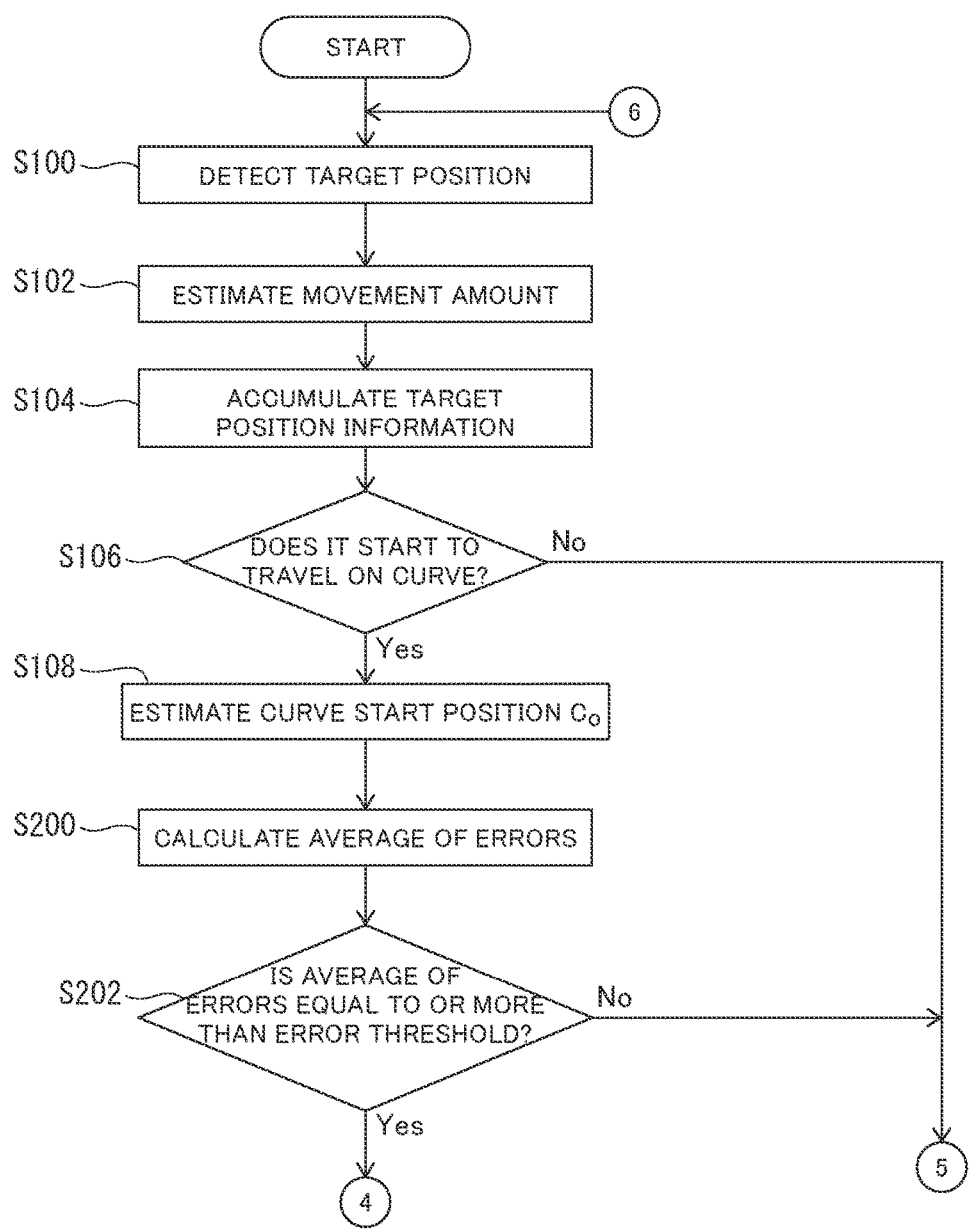
FIG. 8A is a flowchart illustrating processing carried out by a self-position estimation device according to a second embodiment of the present invention.
Figure 8B:
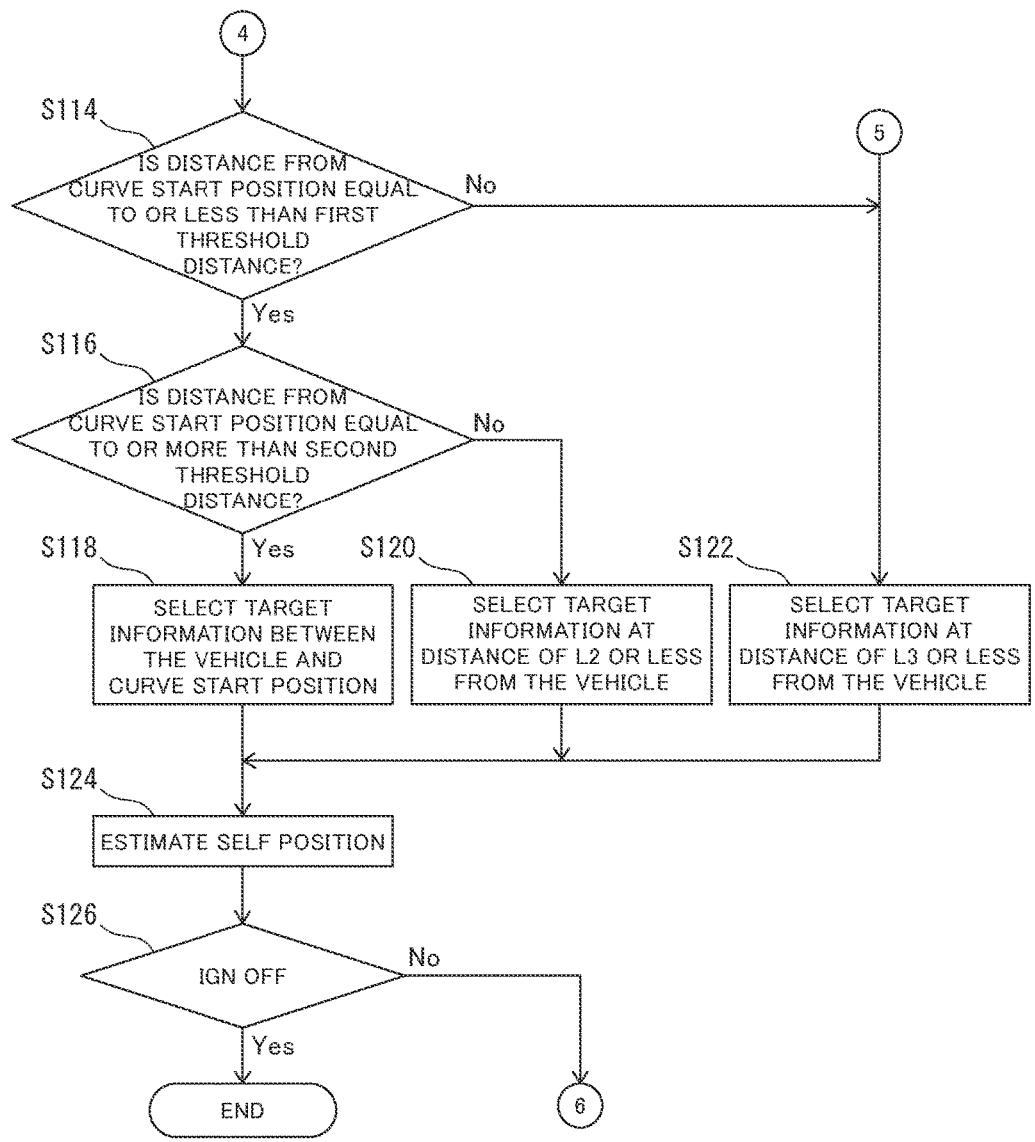
FIG. 8B is a flowchart illustrating the processing carried out by the self-position estimation device according to the second embodiment of the present invention.

First, the processing of step S100 is carried out when the operation performed using the self-position estimation device 1 is started (START) as illustrated in FIG. 8A and FIG. 8B. The processing of step S100 to step S104 are similar to those of the first embodiment described above, and therefore descriptions thereof are omitted.

In step S106, the curve start position estimation unit 50 determines whether or not a travel path on which the vehicle MC is traveling is a curve section. As a result, processing of determining whether or not the vehicle MC starts to travel on a curve section ("DOES IT START TO TRAVEL ON CURVE?" illustrated in the figure) is carried out in step S106. When it is determined that the vehicle MC starts to travel on a curve section ("YES" illustrated in the figure) in step S106, the operation performed using the self-position estimation device 1 goes to step S108.

In contrast, when it is determined that the vehicle MC does not start to travel on a curve section ("NO" illustrated in the figure) in step S106, the operation performed using the self-position estimation device 1 goes to step S122. In step S108, the curve start position estimation unit 50 estimates the curve start position $C_0$ ("ESTIMATE CURVE START POSITION $C_0$" illustrated in the figure). When the curve start position $C_0$ is estimated in step S108, the operation performed using the self-position estimation device 1 goes to step S200.

In step S200, the self-position estimation unit 60 acquires the results of plural comparisons of the selected target position data with the position information of a target, made in the past using the results of the processing carried out in the past. In addition, the average value of the plural minimum errors in the respective comparisons is calculated from the results of the plural comparisons ("CALCULATE AVERAGE OF ERRORS" illustrated in the figure) in step S200. When the average value of the plural minimum errors in the plural comparisons is calculated in step S200, the operation performed using the self-position estimation device 1 goes to step S202. In step S200, the average S of distances Dij is calculated using Equation (1) by a method similar to that of the first embodiment described above (see FIG. 6). In the second embodiment, however, the selected target position data Si used for calculating the average S is limited to the selected target position data Si present in the region R3 (see FIG. 5).

In step S202, the self-position estimation unit 60 carries out processing of determining whether or not the average value of the minimum errors calculated in step S200 is equal to or more than an error threshold ("IS AVERAGE VALUE OF ERRORS EQUAL TO OR LESS THAN ERROR THRESHOLD?" illustrated in the figure).

When it is determined that the average value of the minimum errors calculated in step S200 is equal to or more than the error threshold ("YES" illustrated in the figure) in step S202, the operation performed using the self-position estimation device 1 goes to step S114. In contrast, when it is determined that the average value of the minimum errors calculated in step S200 is more than the error threshold value ("NO" illustrated in the figure) in step S202, the operation performed using the self-position estimation device 1 goes to step S122.

The processing of step S114 to step S126 are similar to those of the first embodiment described above, and therefore descriptions thereof are omitted.

The second embodiment described above is an example of the present invention, the present invention is not limited to the second embodiment described above, and various modifications may be made depending on design or the like without departing from technical idea according to the present invention even if being forms except this embodiment.

Effects of Second Embodiment

The self-position estimation device 1 according to the second embodiment can exhibit effects described below.

(1) The self-position estimation unit 60 calculates, from the results of plural comparisons of the selected target position data with the position information of a target, plural minimum errors in the respective comparisons, and estimates the self-position when the sum of the plural minimum errors is equal to or more than a preset error threshold. Therefore, the self-position is estimated using the target position data present around the vehicle MC and the position of a target present between the current position of the vehicle MC and the curve start position $C_0$ when the sum of the plural minimum errors is equal to or more than the present error threshold. As a result, the self-position is estimated based on the target position data along the shape of a curve even in a situation in which the accuracy of estimation of the forward-backward position of the vehicle MC is prone to deteriorate, and therefore the deterioration of the accuracy of estimation of the self-position in a curved path can be suppressed.

REFERENCE SIGNS LIST

1: self-position estimation device; 2: imaging device; 4: distance measurement device; 6: wheel speed sensor; 8: steering angle sensor; 10: target position detection unit; 20: movement amount estimation unit; 30: target position accumulation unit; 40: map information acquisition unit; 50: curve start position estimation unit; 60: self-position estimation unit; 100; MC: the vehicle; RO: travel road surface; W: wheel; $C_0$: curve start position; CG: center of gravity of vehicle MC; R1: region between curve start position $C_0$ and vehicle MC; R2: region at not more than second threshold distance L2 from vehicle MC; R3: region at not more than third threshold distance L3 from vehicle MC; Ei: selected target position data of which relative position has been detected before arrival at curve start position $C_0$ in direction of travel of vehicle MC; Si: selected target position data of which relative position has been detected between current position of vehicle MC and curve start position $C_0$ in direction of travel of vehicle MC; L: distance between vehicle MC and curve start position $C_0$; L2: second threshold distance; L3: third threshold distance; Mj: position information that is closest to one selected piece of selected target position data Si, of position information of target stored in map information acquisition unit 40; Dij: distance between one selected piece of selected target position data Si and position information Mj

The invention claimed is:

1. A self-position estimation device comprising:
   a target camera mounted in a vehicle, the target camera being configured to detect a relative position of a target present around the vehicle and the vehicle;
   a movement sensor configured to estimate a movement amount of the vehicle;
   a data storage configured to move the detected relative position by the estimated movement amount and to accumulate the moved relative position as target position data;
   a map database configured to acquire map information including target position information of a target present on a map;
   a processor configured to:
     estimate a curve start position of a travel path on which the vehicle travels; and
     perform comparison in which at least the target position data present around the vehicle and the target position data present between a current position of the vehicle after entering the curve and the estimated curve start position, of the accumulated target position data, is compared with the target position information included in the map information to estimate a self-position which is the current position of the vehicle; and
   a drive support system mounted in the vehicle that performs drive support of the vehicle based on the estimated self position, the drive support including at least braking.

2. The self-position estimation device according to claim 1, wherein the processor is further configured to estimate the self-position when a straight travel distance of the vehicle is equal to or more than a preset threshold distance for estimation.

3. The self-position estimation device according to claim 1, wherein the processor is further configured to estimate the self-position when the vehicle travels at a vehicle velocity equal to or less than a preset threshold velocity.

4. The self-position estimation device according to claim 1, wherein the processor is further configured to compare the target position data present in a range in which the vehicle is traced back at a preset threshold distance in a travel pathway of the vehicle, of the accumulated target position data, with the target position information included in the map information to estimate the self-position, and the threshold distance is a distance including the target position data present between the current position of the vehicle and the estimated curve start position, of the accumulated target position data.

5. The self-position estimation device according to claim 1, wherein the processor is further configured to:
   perform the comparison a plurality of times; further calculate a plurality of minimum errors in the comparison from results of the comparison performed the plurality of times; and
   estimate the self-position when a sum of the plurality of minimum errors is equal to or more than a preset error threshold.

6. The self-position estimation device according to claim 1, wherein the processor is further configured to compare the target position data present around the vehicle and the target position data present only between the current position of the vehicle and the estimated curve start position with the target position information included in the map information to estimate the self-position.

7. A self-position estimation method comprising:
   detecting a relative position of a target present around a vehicle and the vehicle;
   estimating a movement amount of the vehicle and a curve start position of a curve of a travel path on which the vehicle travels;
   moving the detected relative position by the estimated movement amount and accumulating the moved relative position as target position data;
   acquiring map information including target position information of a target present on a map;
   performing comparison in which at least the target position data present around the vehicle and the target position data present between a current position of the vehicle after entering the curve and the estimated curve start position, of the accumulated target position data, are compared with the target position information included in the map information to estimate a self-position which is the current position of the vehicle; and
   performing drive support of the vehicle based on the estimated self position, the drive support including at least braking.

* * * * *